Oct. 18, 1949.       B. E. ROETHELI       2,485,317
METHOD OF MANUFACTURING PLASTER OF PARIS
Filed Jan. 29, 1943
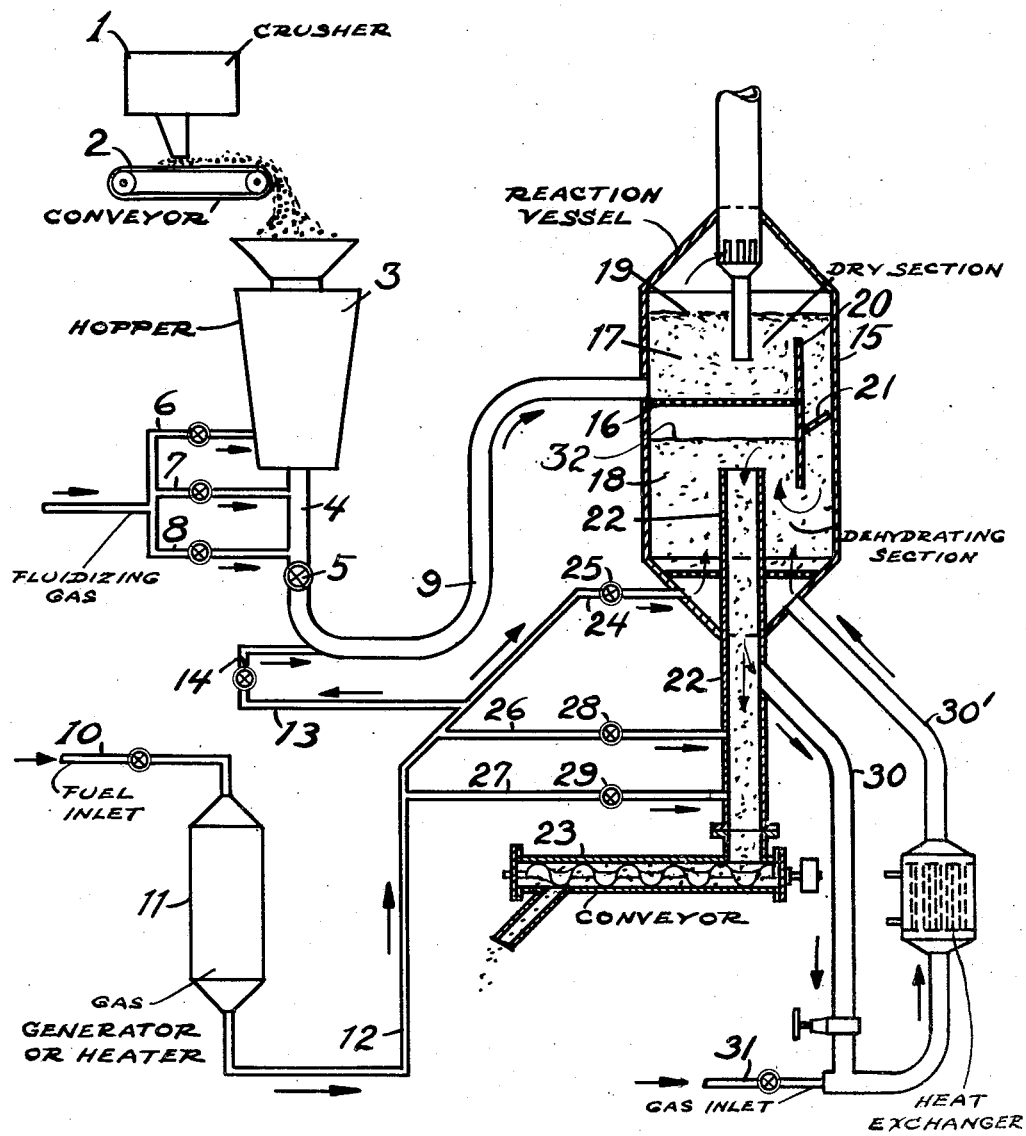
Bruno E. Roetheli Inventor
By R. Young Attorney Patented Oct. 18, 1949

2,485,317

UNITED STATES PATENT OFFICE 2,485,317

METHOD OF MANUFACTURING PLASTER OF PARIS

Bruno E. Roetheli, Cranford, N. J., assignor to Standard Oil Development Company, a corporation of Delaware Application January 29, 1943, Serial No. 474,009

5 Claims. (Cl. 23—122)

This invention relates to improvements in the dehydration of gypsum and particularly to improvements in the manufacture of plaster of Paris.

Heretofore in manufacturing plaster of Paris, gypsum was first crushed so that about 60% to 95% would pass through a 100 mesh sieve. This finely divided gypsum was then passed into a gypsum kettle which consisted of a steel cylinder set in brick-work and heated to temperatures ranging from 100° C. to 204° C. to remove about three quarters of the water of crystallization. The complete removal of water in combination was carefully avoided as anhydrous sulfate of lime, when formed, would not react in the same manner as a partially dehydrated gypsum such as one containing about 25% of water of crystallization. A properly prepared plaster of Paris when mixed with water sets or hardens very promptly, this change being due to absorption of water, forming gypsum again.

The kettle was first heated very gradually while the crude material was also gradually added during this initial heating period. The first portion of the heating period of 100° C. was usually used to drive off the mechanically held water, after which the contents of the kettle was heated until a temperature of about 140° C. was reached. Temperatures in excess of 200° C. were carefully avoided and when pure gypsum was being dehydrated the temperature was very rarely allowed to exceed 120° C. It generally requires about 100 pounds of coal to dehydrate a ton of plaster of Paris to the desired degree. A disadvantage of heating the gypsum in the gypsum kettles in the earlier commercial method of manufacturing plaster of Paris was that the bottom of the direct fired kettles in which heat was supplied to the gypsum through metal walls used in heating were very apt to crack because of local overheating of the metal, especially when stirring was inadequate or poorly controlled. Normally, powdered gypsum in the kettle was continuously agitated by means of stirrers and the stirrers were so arranged as to throw the material toward the center of the kettle. When the gypsum was not stirred during the heating period the charge settled down and hardened so that the bottom would usually be melted out of the kettle.

One object of this invention is to provide a method in which the heating of the powdered gypsum may be uniformly accomplished without resorting to indirect heating.

Another object of this invention is to provide a method in which the amount of fuel necessary to dehydrate gypsum to the plaster of Paris is materially reduced, i. e., the fuel efficiency is increased.

These and other objects of the inventon will be more clearly understood on reading the following description with reference to the drawing showing a diagrammatic view in elevation of part of one form of the apparatus used in carrying out the invention.

Referring to the drawing, numeral 1 designates a crusher in which substantially all the gypsum is reduced so that it will pass through a 100 mesh sieve. The crushed powder is then passed by means of a belt conveyor 2 into a hopper 3 from which it is removed by means of outlet pipe 4 provided with valve 5. The finely divided powder is fluidized as it passes from hopper 3 by blowing a gas through the finely divided powder at a rate of the order of at least 0.01 to 0.05 cubic foot per pound of powder. The fluidizing gas, such as air, nitrogen or flue gas, is supplied by means of pipes 6, 7, and 8. The fluidized finely divided material behaves like a liquid and has many of the hydraulic properties of a liquid in that 1. It flows through pipes under the influence of an unbalanced force such as gravity, differential pressures, etc.

2. It tends to assume the shape of the container.

3. It flows through conduits or pipes accompanied by a pressure drop.

4. Gas seals can be produced in the same manner as a liquid is used to seal a gas holder.

5. The fluidized finely divided material assumes an upper phase boundary "level" in a container as a constant supply of aeration gas is furnished.

A fuel oil or any other fuel material, together with air, is passed by means of pipe 10 into a flue gas generator 11 where the mixture is burned and the hot products of combustion removed by means of pipe 12. A substantial portion of this hot flue gas is passed by means of pipe 13 provided with valve 14 into pipe 9 where it comes in contact with the fluidized powder and the mixture is passed to reaction vessel 15. Reaction vessel 15 is provided with grid 16 that divides it into two parts, the upper part being the drying section 17 and the lower part the dehydrating section 18. The fluidized powder as it passes into the upper part of reaction vessel 15 is maintained at a level 19 and as it dries, it continuously passes over a baffle 20 provided with a butterfly valve 21 through the passage formed by this baffle into a dehydrating section 18 where it is maintained at a level 32 and a portion is continuously withdrawn through pipe 22 and passed by screw conveyor 23 to storage or packaging. The temperature is regulated by means of the flue or suitable hot gas which is introduced into pipe 9 and also introduced by means of pipe 24 provided with valve 25 into the lower part of reaction chamber 15 and pipes 26 and 27 provided with valves 28 and 29 into pipe 22 where the finished material is withdrawn. It may be sometimes desirable to recycle a portion of the plaster of Paris before it is finally removed. This portion may be removed from pipe 22 by means of pipe 30 which acts as a standpipe and returned to the dehydrating section 18 as a less dense mixture through upflow pipe 30', gas being supplied to upflow pipe 30' by means of pipe 31 to aid in the recycling of the material.

Alternately, the drying and/or reaction sections may be fitted with tubes through which a hot fluid such as steam is circulated. The fluidized solids in contact with the outside walls of the tubes being in an ebullient state do not bake on the surface of the tubes as was the case in the old type of operation. Hot gas is still supplied for fluidizing.

By means of this fluidized solid technique, the time of heating the gypsum to reduce it to plaster of Paris is materially reduced with a substantial saving of fuel and a more uiform product is obtained. A better control of the dehydration of gypsum is provided as the residence time of the guypsum in the reaction vessel is controlled by the rate of withdrawal of the finished product by screw conveyor 23 and the extent of recycling through lines 30 and 30'. Moreover, by controlling the rate of withdrawal, recycle rate and the temperature of the hot gas, absolute temperature control is possible. The finished product may be mixed with any retardants as it is withdrawn from the reactor. The temperature used in calcining the gypsum should not exceed 190° C.

I claim:

1. A method of manufacturing plaster of Paris which comprises introducing finely divided raw material used in the manufacture of plaster of Paris and hot gas into a drying zone and passing the hot gas upwardly through said zone to form a fluidized bed of raw material particles having a level therein, maintaining the particles in said drying zone for a time sufficient to drive off some of the free moisture therefrom, withdrawing fluidized at least partly dried raw material particles from the fluidized bed in said drying zone and passing the fluidized particles into a dehydrating zone, passing a hot gas upwardly through said dehydrating zone to maintain the particles as a fluidized bed having a level therein while partial dehydration of the particles is being effected, removing partially dehydrated particles from the fluidized bed in said dehydrating zone and passing at least part of the hot gas from the upper portion of said dehydrating zone to the lower portion of said drying zone.

2. A method of manufacturing plaster of Paris which comprises introducing finely divided gypsum and hot gas into a drying zone and passing the hot gas upwardly through said zone to form a fluidized bed of gypsum particles having a level therein, maintaining the gypsum particles in said drying zone for a time sufficient to drive off some of the moisture from the gypsum, withdrawing fluidized at least partly dried gypsum particles from the fluidized bed in said drying zone and passing the fluidized gypsum particles into a dehydrating zone, passing a hot gas upwardly through said dehydrating zone to maintain the particles as a fluidized bed having a level therein while partial dehydration of the gypsum particles is being effected and removing partially dehydrated gypsum particles from the fluidized bed in said dehydrating zone.

3. A method of manufacturing plaster of Paris which comprises introducing finely divided gypsum and hot gas into a drying zone and passing the hot gas upwardly through said zone to form a fluidized liquid-like bed of gypsum particles having a level therein, maintaining the gypsum particles in said drying zone for a time sufficient to drive off some of the moisture from the gypsum, withdrawing fluidized at least partly dried gypsum particles as a confined stream from the fluidized bed in said drying zone and passing the stream of fluidized gypsum particles into a dehydrating zone arranged at a lower level than said drying zone, passing a hot gas upwardly through said dehydrating zone to maintain the particles as a fluidized bed having a level therein while effecting partial dehydration of the gypsum particles, removing partially dehydrated gypsum particles from the fluidized bed in said dehydrating zone and passing gas from the upper portion of said dehydrating zone to the lower portion of said drying zone for upward passage through said fluidized bed in said drying zone.

4. A method of manufacturing plaster of Paris which comprises introducing finely divided gypsum and hot gas into a drying zone maintained at a temperature between about 100° C. and 190° C. and passing the hot gas upwardly through said zone to form a fluidized bed of gypsum particles having a level therein, maintaining the gypsum particles in said drying zone for a time sufficient to drive off some of the moisture from the gypsum, withdrawing fluidized at least partly dried gympsum particles from the fluidized bed in said drying zone and passing the fluidized gypsum particles into a separate dehydrating zone arranged at a different level with respect to said drying zone and maintained at a temperature between about 100° C. and 190° C., passing a hot gas upwardly through said dehydrating zone to maintain the particles as a fluidized bed having a level therein while partial dehydration of the gypsum particles is being effected to remove about 75% of the water of crystallization from the gypsum particles and removing partially dehydrated gypsum particles from the fluidized bed in said dehydrating zone.

5. A method of manufacturing plaster of Paris which comprises introducing finely divided gypsum and hot gas into a drying zone maintained at a temperature between about 100° C. and 190° C. and passing the hot gas upwardly through said zone to form a fluidized bed of gypsum particles having a level therein, maintaining the gypsum particles in said drying zone for a time sufficient to drive off some of the moisture from the gypsum, withdrawing fluidized at least partly dried gypsum particles from the fluidized bed in said drying zone and passing the fluidized gypsum particles into a dehydrating zone maintained at a temperature between about 100° C. and 190° C., passing a hot gas upwardly through said dehydrating zone to maintain the particles as a fluidized bed having a level therein while partial dehydration of the gypsum particles is being effected, removing partially dehydrated gypsum particles from the fluidized bed in said dehydrating zone, modifying the temperature of at least a portion of the withdrawn partially dehydrated gypsum particles and returning them to said dehydrating zone to control the temperature therein.

BRUNO E. ROETHELI.

REFERENCES CITED

The following references are of record in the file of this patent:

UNITED STATES PATENTS

| Number | Name | Date |
|---|---|---|
| 1,746,294 | Tyler | Feb. 11, 1930 |
| 1,798,857 | Tyler | Mar. 31, 1931 |
| 1,901,051 | Randel | Mar. 14, 1933 |
| 1,984,201 | Senseman | Dec. 11, 1934 |
| 2,177,254 | Heckert | Oct. 24, 1939 |
| 2,270,903 | Rudbach | Jan. 27, 1942 |
| 2,309,034 | Barr | Jan. 19, 1943 |
| 2,311,564 | Munday | Feb. 16, 1943 |